(12) United States Patent
Clément et al.

(10) Patent No.: US 6,551,363 B1
(45) Date of Patent: Apr. 22, 2003

(54) AZO DYE MIXTURES

(75) Inventors: Antoine Clément, Basel (CH); Alfons Arquint, Basel (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 105 days.

(21) Appl. No.: 09/664,905

(22) Filed: Sep. 18, 2000

(30) Foreign Application Priority Data

Sep. 20, 1999 (EP) .............................. 99810835

(51) Int. Cl.[7] ...................... C09B 67/00; C09B 29/045; C09B 29/09; D06P 1/18; D06P 3/36

(52) U.S. Cl. ................... 8/639; 8/691; 8/922

(58) Field of Search ................ 534/788, 581, 534/582; 8/691, 639

(56) References Cited

U.S. PATENT DOCUMENTS 5,723,587 A    3/1998  Clément et al. ............ 534/854

FOREIGN PATENT DOCUMENTS

| DE | 4220731 | | 1/1993 |
|----|---------|---|--------|
| EP | 0468380 | | 1/1992 |
| GB | 1256434 | * | 12/1971 |
| GB | 1351375 | * | 4/1974 |
| GB | 2319528 | | 5/1998 |
| JP | 62-158764 | * | 7/1987 |
| JP | 63-132970 | * | 6/1988 |
| JP | 63-135578 | * | 6/1988 |
| WO | 83/02452 | | 7/1983 |

OTHER PUBLICATIONS

Derwent Abstr. 1993–010053 [02] for DE 4220731 (1993).
A. Peters et al., Dyes and Pigments, 18, (1992), pp. 115–123.
Derwent Abstr. 1988–195962 [28] for JP 63135578, Jun. 1998.

* cited by examiner

*Primary Examiner*—Margaret Einsmann
(74) *Attorney, Agent, or Firm*—Kevin T. Mansfield

(57) ABSTRACT

The present invention relates to a dye mixture comprising as component (A) at least one dye of formula

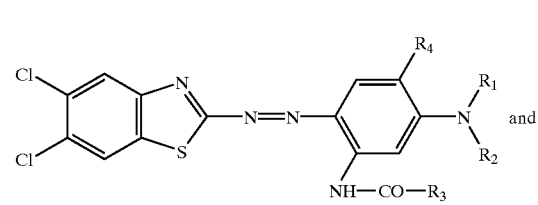

(I)

as component (B) at least one dye of formula

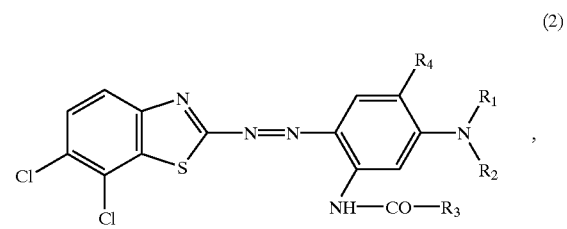

(2)

wherein the substituents $R_1$, $R_2$, $R_3$ and $R_4$ are as defined in claim 1, and to the use of that mixture in the dyeing or printing of semi-synthetic or synthetic hydrophobic fiber materials.

7 Claims, No Drawings

AZO DYE MIXTURES

The present invention relates to mixtures of azo dyes, to their preparation and to their use in the dyeing or printing of semi-synthetic or synthetic hydrophobic fiber materials.

Azo dyes and their use in the dyeing of semi-synthetic or synthetic hydrophobic fiber materials are known. It has been shown, however, that the known dyes do not entirely cover the full range of shades and there is therefore a need for new dyes or dye mixtures that make it possible to obtain the shades lacking hitherto, especially bluish red shades.

It has now been found, surprisingly, that the mixtures according to the invention meet the criteria given above to a considerable degree.

The present invention accordingly relates to a dye mixture comprising as component (A) at least one dye of formula

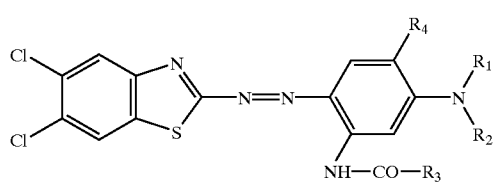

(1)

and
as component (B) at least one dye of formula

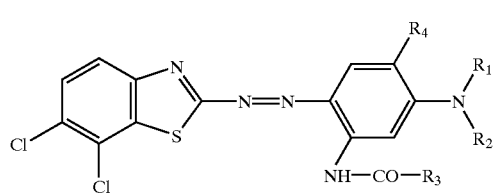

(2)

wherein
$R_1$ is $C_1$–$C_6$alkyl unsubstituted or substituted by hydroxy, cyano, phenyl, acyloxy or

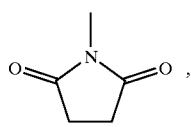

it being possible for the alkyl chain from $C_3$ to be interrupted one or more times by oxygen, or is allyl,
$R_2$ is $C_1$–$C_4$alkyl substituted by $C_1$–$C_4$alkoxycarbonyl, or is n-hexyl,
$R_3$ is $C_1$–$C_4$alkyl, and
$R_4$ is hydrogen, halogen, $C_1$–$C_4$alkyl or $C_1$–$C_4$alkoxy.

$R_1$ as $C_1$–$C_6$alkyl is e.g. methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl, or a respective isomer.

$R_2$, $R_3$ and $R_4$ as $C_1$–$C_4$alkyl are methyl, ethyl, propyl, isopropyl, n-butyl, isobutyl, sec-butyl or tert-butyl.

$R_2$ as $C_1$–$C_4$alkoxycarbonyl is e.g. methoxycarbonyl, ethoxycarbonyl, propoxycarbonyl or butoxycarbonyl.

$R_4$ as $C_1$–$C_4$alkoxy is e.g. methoxy, ethoxy, propoxy or butoxy.

$R_4$ as halogen is fluorine, bromine, iodine or preferably chlorine.

$R_1$ is preferably methyl, unsubstituted or cyano-,hydroxy- or acyloxy-substituted ethyl, allyl, cyclohexyl or benzyl.

$R_2$ is preferably a radical of formula —$CH_2$—$COOCH_3$, —$CH_2$—$COOCH_2CH_3$, —$CH(CH_3)$—$COOCH_3$ or —$CH(CH_3)$—$COOCH_2CH_3$.

$R_3$ is preferably ethyl or isopropyl and especially methyl.
$R_4$ is preferably methyl or methoxy and especially hydrogen or chlorine.

Acyl is preferably formyl, acetyl or propionyl. The ratio of components (A) and (B) in the dye mixtures according to the invention may vary within a wide range, for example from 99:1 to 1:99, especially from 60:40 to 40:60, more especially from 55:45 to 45:55. A dye mixture having a ratio of components (A) and (B) of 50:50 is very especially preferred.

Preference is given to a dye mixture comprising the dyes of formulae (1) and (2) wherein $R_1$ is methyl, unsubstituted or cyano-, hydroxy- or acyloxy-substituted ethyl, allyl, cyclohexyl or benzyl, $R_2$ is a radical of formula —$CH_2$—$COOCH_3$, —$CH_2$—$COOCH_2CH_3$, —$CH(CH_3)$—$COOCH_3$ or —$CH(CH_3)$—$COOCH_2CH_3$, $R_3$ is methyl, ethyl or isopropyl and $R_4$ is hydrogen, methyl, methoxy or chlorine.

Special preference is given to a dye mixture comprising as component (A) the dye of formula

(3)

and as component (B) the dye of formula

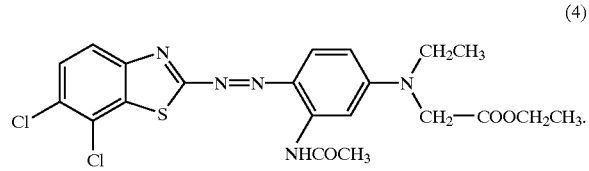

(4)

Special preference is also given to a dye mixture comprising the dyes of formulae (1) and (2) wherein $R_1$ is ethyl, $R_2$ is n-hexyl, $R_3$ is methyl and $R_4$ is hydrogen.

Very special preference is given to a dye mixture comprising the dyes of formulae (3) and (4) in a ratio of 50:50.

Very special preference is also given to dye mixtures of the dyes of formulae (1) and (2) having CIELAB coordinates a* of from 37 to 60, especially from 55 to 58, and b* of from −5 to 25, especially from −2 to 20.

The determination of the CIELAB coordinates a* and b* is described in the German standard DIN 6174 "Farbmetrische Bestimmung von Farbabstanden bei Körperfarben nach der CIELAB-Formel" ("Colorimetric determination of colour distances in surface colours in accordance with the CIELAB formula") of January 1979. The present invention relates also to the process for the preparation of the dye mixtures of formulae (1) and (2) according to the invention.

They are prepared, for example, as follows: a compound of formula

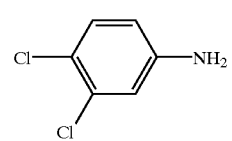

(50)

is reacted with $Br_2$ and KSCN in acetic acid analogously to a procedure described on pages 57 to 64 of "Dyes and Pigments", Vol. 38 to form a mixture comprising the compounds of formulae

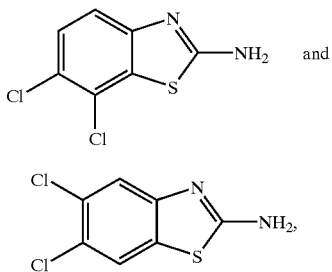

the resulting mixture is diazotised in accordance with a customary procedure and then coupled to a coupling component of formula

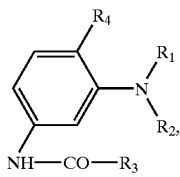

$R_1$, $R_2$, $R_3$ and $R_4$ being as defined above.

The diazotisation of the compounds of formulae (51) and (51a) is carried out in a manner known per se, for example with sodium nitrite in an acidic, e.g. hydrochloric-acid-containing or sulfuric-acid-containing, aqueous medium. The diazotisation may, however, also be carried out using other diazotisation agents, e.g. with nitrosylsulfuric acid. In the diazotisation, an additional acid may be present in the reaction medium, e.g. phosphoric acid, sulfuric acid, acetic acid, propionic acid or hydrochloric acid or a mixture of such acids, e.g. a mixture of propionic acid and acetic acid. The diazotisation is advantageously carried out at temperatures of from −10 to 30° C., for example from −10° C. to room temperature. The coupling of the mixture of the diazotised compounds of formulae (51) and (51a) to the coupling component of formula (52) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The compound of formula (50) is known and can be prepared in a manner known per se.

The coupling component of formula (52) can be prepared in a manner known per se by reacting, for example, a compound of formula

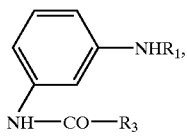

wherein $R_1$ and $R_3$ are as defined above, with $ClCH_2COOCH_3$, $ClCH_2COOC_2H_5$, $ClCH(CH_3)COOCH_3$ or $ClCH(CH_3)COOC_2H_5$ in the presence of sodium carbonate at elevated temperature.

The dye mixtures according to the invention may also be prepared by simply mixing the dyes of formulae (1) and (2) together.

The dye mixtures according to the invention can be used as dyes in the dyeing and printing of semi-synthetic and, especially, synthetic hydrophobic fiber materials, more especially textile materials. Textile materials composed of blends that contain such semi-synthetic and/or synthetic hydrophobic textile materials can likewise be dyed or printed using the compounds according to the invention.

Semi-synthetic textile materials that come into consideration are especially cellulose 2½-acetate and cellulose triacetate.

Synthetic hydrophobic textile materials consist especially of linear, aromatic polyesters, for example those of terephthalic acid and glycols, especially ethylene glycol, or condensation products of terephthalic acid and 1,4-bis (hydroxymethyl)cyclohexane; of polycarbonates, e.g. those of α,α-dimethyl-4,4-dihydroxy-diphenylmethane and phosgene, and of fibers based on polyvinyl chloride and on polyamide.

The application of the compounds according to the invention to the textile materials is effected in accordance with known dyeing procedures. For example, polyester fiber materials are dyed in the exhaust process from an aqueous dispersion in the presence of customary anionic or non-ionic dispersants and optionally customary swelling agents (carriers) at temperatures of from 80 to 140° C. Cellulose 2½-acetate is dyed preferably at about from 65 to 85° C. and cellulose triacetate at temperatures of up to 115° C.

The dye mixtures according to the invention will not stain wool and cotton present at the same time in the dyebath or will stain such materials only slightly (very good reservation), so that they can also be used satisfactorily to dye polyester/wool and polyester/cellulose fiber blend fabrics.

The dye mixtures according to the invention are suitable for dyeing in accordance with the thermosol process, in the exhaust and continuous process and for printing processes. The exhaust process is preferred. The liquor ratio is dependent upon the nature of the apparatus, the substrate and the form of make-up. It may, however, be selected within a wide range, e.g. from 1:4 to 1:100, but is preferably from 1:6 to 1:25.

The said textile material can be in a variety of processing forms, e.g. in the form of fibers, yarns or non-wovens and in the form of woven fabrics or knitted fabrics.

It is advantageous to convert the dye mixtures according to the invention into a dye preparation prior to use. For this purpose, the dye mixture is ground so that its particle size is on average from 0.1 to 10 microns. The grinding can be carried out in the presence of dispersants. For example, the dried dye mixture is ground with a dispersant or is kneaded in paste form with a dispersant and then dried in vacuo or by atomisation. The preparations so obtained can be used, after the addition of water, to prepare printing pastes and dyebaths. For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The dye mixtures according to the invention impart to the mentioned materials, especially to polyester material, level colour shades having very good in-use fastness properties, such as, especially, good fastness to light, fastness to thermofixing, to pleating, to chlorine and to wetting, such as fastness to water, perspiration and washing; the finished dyeings are also distinguished by good fastness to rubbing.

The dye mixtures according to the invention can also be used satisfactorily in the preparation of mixed shades together with other dyes. The dye mixtures according to the invention can be used especially as a red component in a trichromatic dyeing or printing technique.

The dye mixtures according to the invention are also very suitable for dyeing hydrophobic textile material from supercritical $CO_2$.

The present invention relates also to the above-mentioned use of the dye mixtures according to the invention as well as to a process for the dyeing or printing of semi-synthetic or synthetic hydrophobic fiber material, especially textile material, which comprises applying the dye mixture according to the invention to the said material or incorporating it into the material. The said hydrophobic fiber material is preferably textile polyester material. Further substrates that can be treated by the process according to the invention and preferred process conditions can be found above in the detailed description of the use of the dye mixtures according to the invention.

The invention relates also to the hydrophobic fiber material, especially polyester textile material, dyed or printed by the said process.

The dye mixtures according to the invention are also suitable for modern reproduction processes, e.g. thermotransfer printing.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimetres.

EXAMPLE 1

40.0 ml of anhydrous acetic acid are introduced into a reaction vessel. 5.4 parts by weight of a 50:50 mixture of 2-amino-5,6-dichlorobenzothiazole and 2-amino-6,7-dichlorobenzo-thiazole are then added thereto at room temperature in the course of 3 minutes; the mixture is stirred for 5 minutes and 0.6 ml of 98% sulfuric acid is added. Then, in the course of 15 minutes, 4.0 ml of 40% nitrosylsulfuric acid are added dropwise to the reaction mixture. When the addition is complete, the reaction mixture is stirred at a temperature of 10–15° C. for 2 hours to complete the reaction. The resulting diazo solution is then added dropwise in the course of 30 minutes to a solution of 5.6 parts by weight of the coupling component of formula

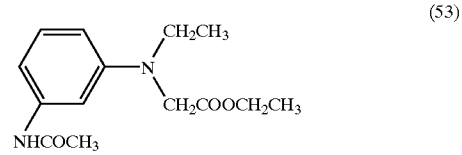
(53)

dissolved in 100 parts by weight of anhydrous acetic acid, the reaction temperature being maintained at 0–15° C. by the addition of 400 parts by weight of ice. Once the addition of the diazo solution is complete, the reaction mixture is stirred for 40 minutes. The precipitated dye is filtered off with suction, washed with water and dried. A reddish-brown 50:50 dye mixture of the dyes of formulae

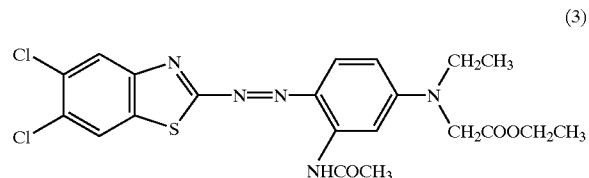
(3)

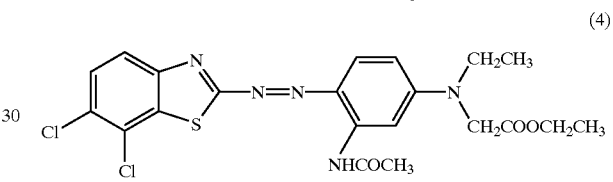
(4)

is obtained.

EXAMPLES 2–18

By following the procedure as described in Example 1, but using instead of 5.6 parts by weight of the coupling component of formula (53) an equimolar amount of one of the coupling components listed in Table 1, the dye mixtures listed in Table 1 are obtained:

TABLE 1

| Ex. | Coupling component of formula | Dye mixture of formula |
|---|---|---|
| 2 | (structure with NHCOCH₃, N(CH₂CH=CH₂)(CH(CH₃)COOCH₃)) | (two benzothiazole azo dye structures with 5,6-diCl and 6,7-diCl isomers, N(CH₂CH=CH₂)(CH(CH₃)COOCH₃), NHCOCH₃) |
| 3 | (structure with Cl, NHCOCH₃, N(CH₂CH=CH₂)(CH₂COOCH₃)) | (benzothiazole azo dye with 5,6-diCl, Cl, N(CH₂CH=CH₂)(CH₂COOCH₃), NHCOCH₃) |

TABLE 1-continued

| Ex. | Coupling component of formula | Dye mixture of formula |
|---|---|---|
| | | benzothiazole(6,7-diCl)–N=N–phenyl(2-Cl, 5-NHCOCH₃)–N(CH₂CH=CH₂)(CH₂COOCH₃) |
| 4 | phenyl(3-NHCOCH₃)–N(CH₂CH₂C₆H₅)(CH(CH₃)COOCH₃) | benzothiazole(5,6-diCl)–N=N–phenyl(3-NHCOCH₃)–N(CH₂CH₂C₆H₅)(CH(CH₃)COOCH₃) and benzothiazole(6,7-diCl)–N=N–phenyl(3-NHCOCH₃)–N(CH₂CH₂C₆H₅)(CH(CH₃)COOCH₃) |
| 5 | phenyl(3-NHCOCH₃)–N(CH₂CH₃)(CH(CH₃)COOCH₃) | benzothiazole(5,6-diCl)–N=N–phenyl(3-NHCOCH₃)–N(CH₂CH₃)(CH(CH₃)COOCH₃) and benzothiazole(6,7-diCl)–N=N–phenyl(3-NHCOCH₃)–N(CH₂CH₃)(CH(CH₃)COOCH₃) |
| 6 | phenyl(3-NHCOCH₃)–CH(CH₂CH₃)(CH(CH₃)COOCH₂CH₃) | benzothiazole(5,6-diCl)–N=N–phenyl(3-NHCOCH₃)–N(CH₂CH₃)(CH(CH₃)COOCH₂CH₃) and benzothiazole(6,7-diCl)–N=N–phenyl(3-NHCOCH₃)–N(CH₂CH₃)(CH(CH₃)COOCH₂CH₃) |
| 7 | phenyl(3-NHCOCH₃)–N(CH₂CH₂CN)(CH(CH₃)COOCH₃) | benzothiazole(5,6-diCl)–N=N–phenyl(3-NHCOCH₃)–N(CH₂CH₂CN)(CH(CH₃)COOCH₃) and benzothiazole(6,7-diCl)–N=N–phenyl(3-NHCOCH₃)–N(CH₂CH₂CN)(CH(CH₃)COOCH₃) |

TABLE 1-continued
| Ex. | Coupling component of formula | Dye mixture of formula |
|---|---|---|
| 8 | 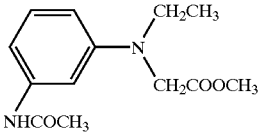 | 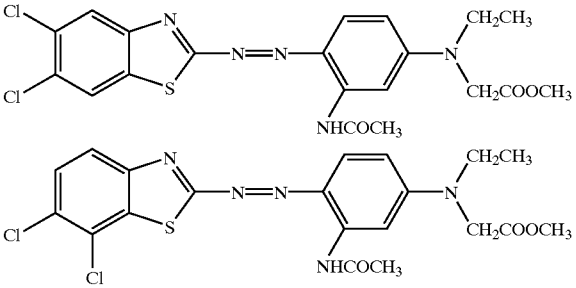 |
| 9 | 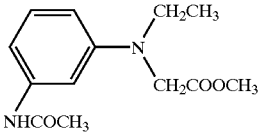 | |
| 10 | 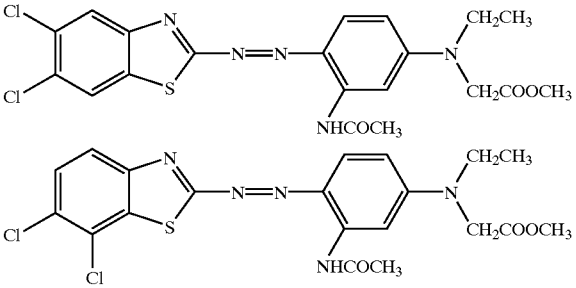 | 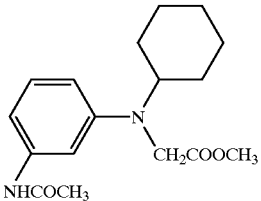 |
| 11 | 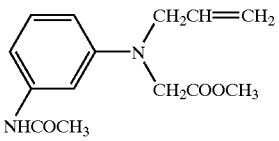 | 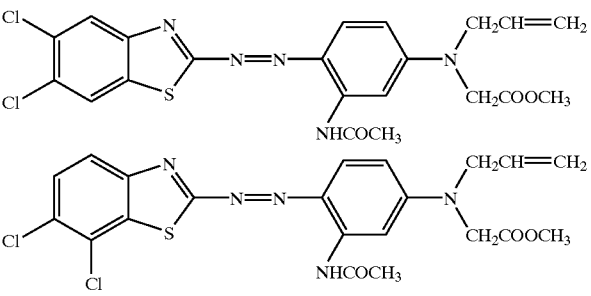 |
| 12 | 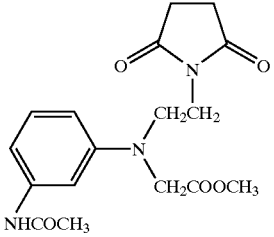 | 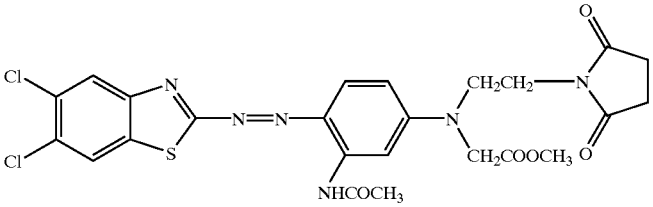 |

TABLE 1-continued

| Ex. | Coupling component of formula | Dye mixture of formula |
|---|---|---|
| 13 | | |
| 14 | | |
| 15 | | |
| 16 | | |

TABLE 1-continued

| Ex. | Coupling component of formula | Dye mixture of formula |
|---|---|---|
| 17 | 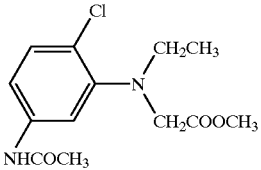 | 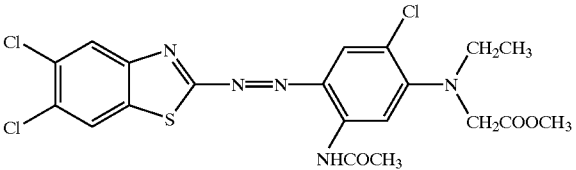 |
| 18 | 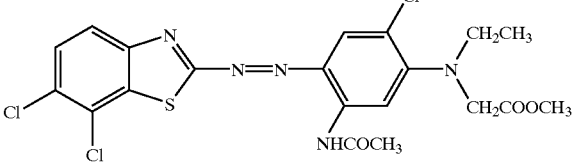 | 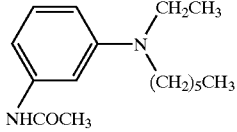 |

What is claimed is:

1. A dye mixture comprising as component (A) at least one dye of formula

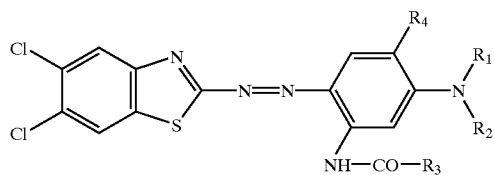

(1)

and as component (B) at least one dye of formula

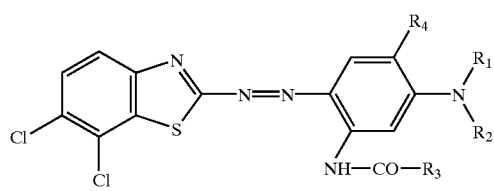

(2)

wherein $R_1$ is $C_1$–$C_6$alkyl unsubstituted or substituted by hydroxy, cyano, phenyl, acyloxy or

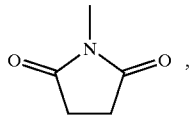

it being possible for the alkyl chain from $C_3$ to be interrupted one or more times by oxygen, or is allyl, $R_2$ is $C_1$–$C_4$alkyl substituted by $C_1$–$C_4$alkoxycarbonyl, or is n-hexyl, $R_3$ is $C_1$–$C_4$alkyl, and $R_4$ is hydrogen, halogen, $C_1$–$C_4$alkyl or $C_1$–$C_4$alkoxy.

2. A dye mixture according to claim 1, wherein $R_1$ is methyl, unsubstituted or cyano-, hydroxy- or acyloxy-substituted ethyl, allyl, cyclohexyl or benzyl, $R_2$ is a radical of formula —$CH_2$—$COOCH_3$, —$CH_2$—$COOCH_2CH_3$, —$CH(CH_3)$—$COOCH_3$ or —$CH(CH_3)$ —$COOCH_2CH_3$, $R_3$ is methyl, ethyl or isopropyl and $R_4$ is hydrogen, methyl, methoxy or chlorine.

3. A dye mixture according to claim 1, wherein $R_1$ is ethyl, $R_2$ is n-hexyl, $R_3$ is methyl and $R_4$ is hydrogen.

4. A dye mixture according to claim 2, wherein $R_3$ is methyl and $R_4$ is hydrogen or chlorine.

5. A dye mixture according to claim 2, wherein $R_1$ is ethyl, $R_2$ is —$CH_2$—$COOCH_2CH_3$, $R_3$ is methyl and $R_4$ is hydrogen.

6. A semi-synthetic or synthetic hydrophobic fiber material dyed or printed with a dye mixture according to claim 1.

7. A method of dyeing or printing semi-synthetic or synthetic hydrophobic fiber materials which comprises contacting said materials with a tinctorially effective amount of a dye mixture according to claim 1.

* * * * *